F. A. Calvert.
Burring Mach.

Nº 5,240.                    Patented Aug. 14, 1847.

UNITED STATES PATENT OFFICE.

FRANCIS A. CALVERT, OF LOWELL, MASSACHUSETTS.

GUARD-CYLINDER FOR BURRING-MACHINES.

Specification of Letters Patent No. 5,240, dated August 14, 1847.

*To all whom it may concern:*

Be it known that I, FRANCIS A. CALVERT, of Lowell, in the county of Middlesex and State of Massachusetts, have invented certain new and useful Improvements in Toothed or Saw-Guard Cylinders Used in Machines for Burring and Cleaning and Ginning Wool and Cotton, and that the following description, taken in connection with the accompanying drawings, hereinafter referred to, forms a full and exact specification of the same, wherein I have set forth the nature and principles of my said improvements, by which my invention may be distinguished from others of a similar kind, together with such parts as I claim and desire to have secured to me by Letters Patent.

The toothed or saw guard cylinder, which I have improved upon, is now principally used in the machine "for picking wool and separating burs and other foreign matter therefrom and for ginning cotton" secured to me by a patent dated June 3d A. D. 1843, which patent was surrendered and reissued the 27th day of December of the same year. It is now used in said machine, in combination with the "fine comb cylinder," on which the wool or cotton is spread the said toothed cylinder operating to beat or disengage therefrom any burs, seeds or other foreign matter, and the construction of said last named cylinder as described in said patent being as follows. Any requisite number of circular saws of the proper diameter are placed upon a shaft at proper intervals apart from each other, and between them are interposed disks of wood or other substance of about an eighth of an inch in thickness, thus forming a cylinder of saws similar to that used in the saw-gin for ginning cotton."

By my improvement the "saw guard cylinder" is made entirely solid or in one piece, and the teeth are shaped or cut on the same, so as to operate more effectually in cleaning out the burs and less injuriously on the staple of wool or other fibrous materials as will be explained in the sequel.

Figure 1:
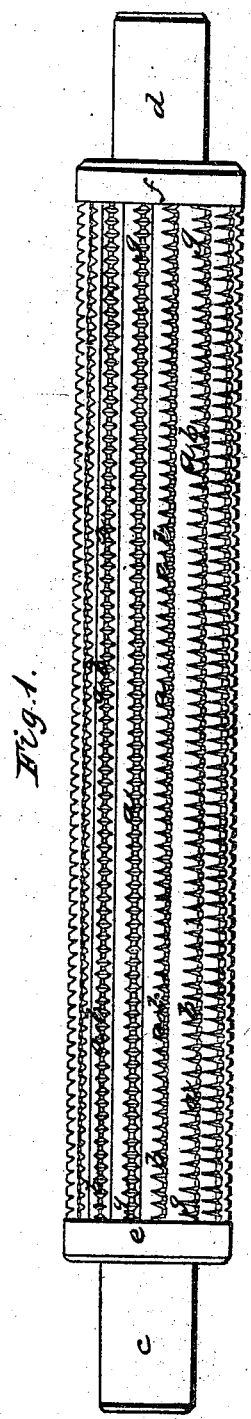
Figure 2:
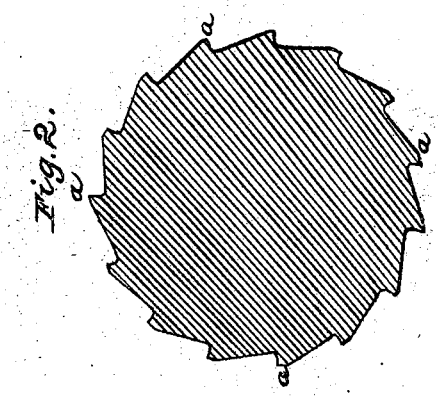

In the accompanying plate of drawings Fig. 1, is a plan or top view of my improved saw-guard cylinder and Fig. 2, is a vertical cross section.

The proportions of Fig. 1, are one quarter of the full dimensions of the cylinder; the distance from center to center of the exterior faces of two succeeding teeth, (in a direction around the cylinder), being one half of that in the working machine, and the teeth and the depth of the spiral grooves between them being full size. Fig. 2, is drawn on a scale double that used for Fig. 1.

The teeth $a$, $a$, $a$, $a$, &c., are shaped as shown in the aforesaid figures like frusto of pyramids nearly, the surfaces of the sides being dissimilar and their front faces being a little curved at the bottom as shown in Fig. 2. Between the teeth a wedge shaped groove $b$—$b$—$b$—$b$, &c., is cut or formed as shown in Fig. 1. Each tooth is placed partially behind the tooth in front, (in the preceding row of teeth), and partially behind the groove or space adjacent to said preceding tooth in front, or in fact the teeth and grooves may be said to be formed or, set spirally around the cylinder, that is to say a line drawn continuously and successively through the center of the top face of one tooth and of the tooth most nearly before it and so on, would describe a continuous spiral line around said cylinder, and a line drawn similarly through the angles or bottoms of the grooves $b$—$b$— between the teeth would describe and be a parallel spiral line to that above specified. This spiral arrangement of the teeth insures their efficient action upon the burs and other foreign matter in wool or cotton much more perfectly than the plan of construction for said cylinders herein above first described, while the wedging shape of the spaces or grooves $b$—$b$ and their spiral arrangement permits the fibers of the wool or cotton to pass without breaking, while the burs, seeds, &c., are entirely separated therefrom without clogging the cylinder, and the "receiver" so called in the burring and ginning machines, can more readily clean any foreign substance from the said saw-guard cylinder, than from such a cylinder as is used in the machine patented by me as herein above set forth.

The facility cheapness and accuracy with which my improved cylinder may be made give it the advantage over any other similar mechanical device. It is formed from a solid cylinder of steel or malleable cast iron of the diameter of the end shoulders $e$—$f$, and having two journals $c$—$d$. The longitudinal grooves $g$ $g$—$g$ $g$ are first formed by any suitable tool, and then by a cutting instrument similar to or precisely like that for cutting a screw thread, the wedge shaped grooves or notches $b$, $b$, &c., are cut leaving the teeth $a$—$a$—$a$, &c., raised as shown in the figures.

Having thus described my improved saw-guard cylinder, I shall state my claim as follows.

What I claim as my invention and desire to have secured to me by Letters Patent is—

A "saw-guard cylinder" made in one solid piece with the teeth $a$, $a$, $a$ and grooves $b$—$b$, shaped and set spirally substantially as herein above set forth.

In testimony that the foregoing is a true description of my said invention and improvements I have hereto set my signature this twenty second day of June in the year 1847.

FRANCIS A. CALVERT.

Witnesses:
EZRA LINCOLN, Jr.,
JOEL GILES.